United States Patent
Brosnan et al.

(10) Patent No.: US 9,282,593 B2
(45) Date of Patent: Mar. 8, 2016

(54) DEVICE AND SYSTEM FOR INDUCTION HEATING

(75) Inventors: Daniel Brosnan, Louisville, KY (US);
Mariano Filippa, Louisville, KY (US);
Mark Johnson, Louisville, KY (US);
Timothy Shaffer, Louisville, KY (US);
Brian Steurer, Louisville, KY (US)

(73) Assignee: General Electric Company, Schenectady, NY (US)

( * ) Notice: Subject to any disclaimer, the term of this patent is extended or adjusted under 35 U.S.C. 154(b) by 717 days.

(21) Appl. No.: 13/152,398

(22) Filed: Jun. 3, 2011

(65) Prior Publication Data

US 2012/0305545 A1 Dec. 6, 2012

(51) Int. Cl.
*H05B 6/12* (2006.01)
*H05B 6/36* (2006.01)
*H05B 6/06* (2006.01)

(52) U.S. Cl.
CPC ............. *H05B 6/1272* (2013.01); *H05B 6/065* (2013.01); *H05B 2213/05* (2013.01); *Y02B 40/126* (2013.01)

(58) Field of Classification Search
CPC ...... H05B 6/062; H05B 6/065; H05B 6/1209; H05B 6/1272; H05B 2206/022; Y02B 40/126
USPC .......... 219/620–622, 624–626, 630, 642, 675
See application file for complete search history.

(56) References Cited

U.S. PATENT DOCUMENTS

| | | | |
|---|---|---|---|
| 3,827,017 A | | 7/1974 | Keller |
| 3,989,916 A | | 11/1976 | Amagami et al. |
| 4,453,067 A | | 6/1984 | Karklys et al. |
| 5,352,864 A | * | 10/1994 | Schultheis et al. ........ 219/448.17 |
| 5,714,739 A | | 2/1998 | Irrera et al. |

(Continued)

FOREIGN PATENT DOCUMENTS

| | | |
|---|---|---|
| EP | 0376760 A1 | 7/1990 |
| EP | 0498735 A1 | 8/1992 |

(Continued)

OTHER PUBLICATIONS

European Search Report and Written Opinion issued in connection with corresponding EP Application No. 12170447.2 dated Mar. 8, 2013.

*Primary Examiner* — Dana Ross
*Assistant Examiner* — Lindsey C Teaters
(74) *Attorney, Agent, or Firm* — Dority & Manning, P.A.

(57) ABSTRACT

An induction heating system comprises inductive rings, which in one example are concentrically wound about a center axis to form a coil array. The inductive rings are situated in the coil array to permit activation of the inductive rings independent of the other inductive rings in the coil array. In one embodiment, the induction heating system includes a control structure with a power supply and switches coupled to each of the inductive rings, wherein activation of the switches permits current from the power supply to flow to the corresponding inductive ring. The induction heating system is amenable to appliances such as ovens and ranges, as well as to cooktops such as free-standing cooktops for countertops.

15 Claims, 6 Drawing Sheets

(56) References Cited

U.S. PATENT DOCUMENTS

| | | |
|---|---|---|
| 5,808,280 A | 9/1998 | Gaspard |
| 6,169,486 B1 | 1/2001 | Berkcan et al. |
| 6,288,374 B1 | 9/2001 | Eskildsen et al. |
| 6,633,023 B2 | 10/2003 | Cornec et al. |
| 6,956,188 B2 | 10/2005 | de Rooij et al. |
| 2005/0127065 A1 | 6/2005 | de Rooij et al. |
| 2009/0120928 A1* | 5/2009 | Lee et al. ............ 219/626 |

FOREIGN PATENT DOCUMENTS

| | | |
|---|---|---|
| EP | 0716560 A1 | 6/1996 |
| EP | 1137324 A1 | 9/2001 |
| EP | 1194011 B1 | 9/2008 |
| EP | 2059091 A2 | 5/2009 |
| EP | 2237641 A1 | 10/2010 |
| GB | 2048025 A | 12/1980 |
| JP | 2002231430 A | 8/2002 |

\* cited by examiner

DEVICE AND SYSTEM FOR INDUCTION HEATING

BACKGROUND

1. Technical Field

The subject matter disclosed herein relates generally to appliances and, more particularly, to an induction heating system that is configured to vary the power density profile for heating electrically conductive objects.

2. Description of Related Art

Induction heating is a method of heating an electrically conductive load using an alternating magnetic field to induce currents in the load. Induction heating is beneficial in applications where direct contact with a load is undesired or unattainable. This method is also efficient because the majority of heating energy appears directly within the load.

Induction cooking systems work according to the principle of electromagnetic induction. These systems are configured to induce an eddy current into the base of an electrically conductive cooking vessel, such as a pan, pot, or skillet. Heat is generated because the cooking vessel exhibits resistance to the induced eddy currents.

In many systems the eddy currents are induced by a coil or ring placed beneath the cooking vessel. Alternating current (AC) input is supplied to the coil such as by an inverter, which is configured to provide the AC input at, but not limited to, a frequency of 20 kilohertz or greater. A magnetic field is generated by the AC current in the coil. The magnetic field induces the eddy currents that flow in the base of the cooking vessel. Food and/or water is heated conductively by the heated cooking vessel.

Conventional induction cooking systems often utilize a single wound ring or discrete groupings of wound rings to generate the magnetic field. These configurations limit the extent to which the resulting power density profile can vary. When constructed of the single wound ring, for example, the power density profile is generally fixed by the spacing and configuration of the concentric windings of the wound rings. Similar limitations also affect the induction cooking systems that use discrete groupings. Although the power density profile can vary in accordance with the collective manipulation of the discrete groups, the induction cooking system is still effectively restricted to the power density profiles that are effectuated by the configuration of the groupings of the heating device.

BRIEF DESCRIPTION OF THE INVENTION

It would be advantageous to have a device for use in an induction cooking system with a power density profile that can vary independently of the configuration of the coil and/or the wound rings.

There is described in one embodiment a heating device for induction cooking systems. The heating device comprises an inductive ring array forming a heating zone on which an object to be heated can be positioned, the inductive ring array comprising a plurality of inductive rings that are disposed across the heating zone. In one example, each of the inductive rings is configured to be selectively energized independently from concentrically adjacent ones of the inductive rings in the inductive ring array.

There is described in another embodiment an appliance that comprises an induction element comprising inductive rings forming a heating zone on which an object to be heated can be positioned. The appliance also comprises a power supply coupled to the induction element and a switching device coupled to the power supply and to the each of the inductive rings. The appliance further comprises a control device coupled to the switching device and the power supply. In one example, the control device is configured to selectively energize each of the inductive rings by the power supply independently from concentrically adjacent ones of the inductive rings in the heating zone.

BRIEF DESCRIPTION OF THE DRAWINGS

Reference is now made briefly to the accompanying drawings in which.

Where noted like reference characters designate identical or corresponding components and units throughout the several views, which are not to scale unless otherwise indicated.

DETAILED DESCRIPTION OF THE INVENTION

Figure 1:
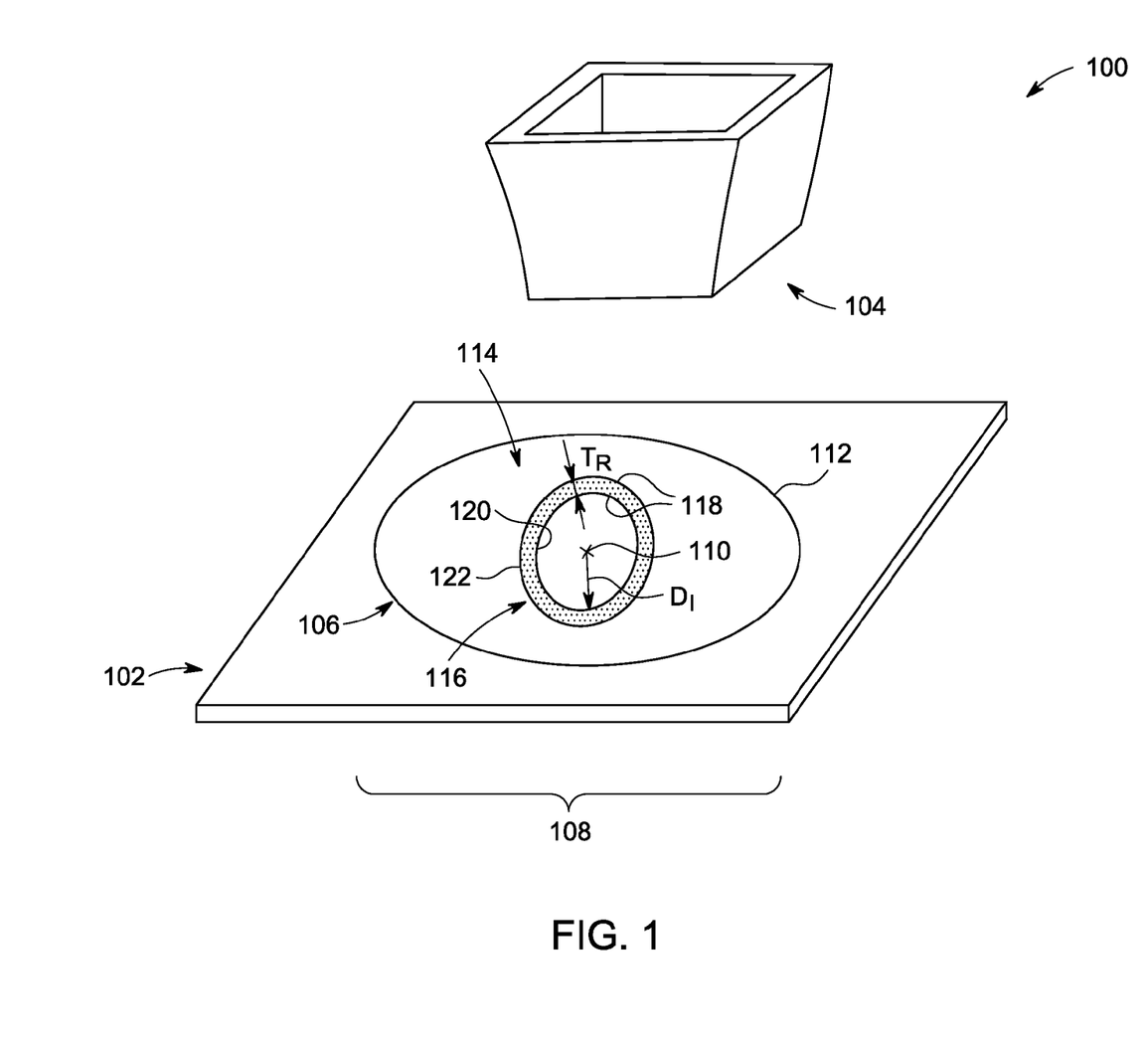
FIG. 1 is a top, schematic view of an exemplary embodiment of an induction heating system.

FIG. 1 depicts in schematic form an exemplary embodiment of an induction cooking system, generally denoted by 100, which employs a heating device 102 that is configured to generate heat in an object 104 (e.g., a pot or pan). The heating device 102 includes an inductive element 106 with a form factor 108 that has a center axis 110 and an outer peripheral edge 112 of generally annular shape. The outer peripheral edge 112 bounds the outer periphery of a heating zone 114 in which is formed a heating ring 116 such as by energizing the inductive element 106. The heating ring 116 is disposed annularly about the center axis 110 and has boundaries 118 within which is generated the magnetic energy to cause heating of the object 104 and, as a result, the heating and cooking of, e.g., items disposed in the object 104. The boundaries 118 comprise an inner boundary 120 and an outer boundary 122 separated from the inner boundary 120 by a ring thickness $T_R$. The position of the heating ring 116 is defined by one or more dimensions, which in this case comprises an inner radial dimension $D_I$ that extends from the center axis 110 to the inner boundary 120.

At a relatively high level, the basic mechanism of induction heating as applied to the induction heating system 100 comprises an alternating magnetic field coupled across a gap with the bottom of the object 104, which acts as a single turn secondary winding. The induction element 106 is often located below a ceramic, glass, or non-ferrous cooking surface which may be in the form of a substantially unbroken supporting plate. In one embodiment, the induction heating system 100 employs a static power conversion circuit including a filter and an inverter for converting a filtered unidirectional voltage to ultrasonic power for driving the induction heating coil.

Components for heating, in addition to the gating circuit for the inverter power devices, may include any one or more of an inhibit circuit for selectively inhibiting operations of the inverter, start-up and shut-down devices coupled to the inhibit and gating circuits for controlling transients and the application and removal of voltage from the inverter, a protection device, output power adjusting devices, pan and resonance detection, and user controls. The power output of the inverter is modulated to change the heating level in the object 104 and, therefore, the temperature at which items in the object are heated (and/or cooked). Static power converters, especially those with semiconductor components, may require protection to prevent malfunction and failure under abnormal circuit conditions, such as over voltages and over currents.

During operation the object 104 is the inverter load and reflected impedance can change the inverter's electrical parameters. There are severe load requirements if the induction heating system 100 is to be operable with a variety of objects (e.g., the object 104) of different sizes and materials, under both load and no-load conditions. The requirement for automatic and continuous operation means that the circuit design must anticipate circumstances that could cause failure or temporary shutdown.

While the mechanisms of induction heating are known, the inventors propose below constructions for the induction heating system 100 in which the heating zone 114 is manipulated to effectuate a variety of heating and cooking properties. Embodiments of the induction heating system 100 are configured, for example, to change certain parameters of the heating ring 116 such as the position (e.g., the inner radial dimension $D_I$) and the size (e.g., the ring thickness $T_R$). These embodiments can also generate in the heating zone 114 multiple ones of the heating ring 116. These features, alone or in combination with other such features, are useful to coordinate with the object 104 the magnetic energy available in the heating zone 114. In one example, the inventors have identified configurations of the induction element 106 (and the induction heating system 100 generally) wherein the parameters of the heating ring 116 are selected based on characteristics of the object 104 such as the size and material construction of the object 104 and/or the items to be heated.

Concepts are also discussed that are useful to provide enhanced control and manipulation of the power density profile across the heating zone 114. Whereas the power density profile is often fixed relative to the geometry of the induction element 106, the inventors identify herein embodiments of the induction heating system 100 that operate in a manner that provides finite and discernable variations and control of the power density profile across the heating zone 114. These embodiments are configured, in one example, wherein the induction element 106 has individual coils that are arranged uniformly such as with uniform spacing between concentrically adjacent coils disposed in the heating zone 114. This arrangement is contrary to conventional designs because individual coils are rarely implemented in lieu of continuous, spiral-wound coils, even in systems with discrete groupings, and because the power density profile created by coils of uniform spacing is generally non-uniform. That is, artisans skilled in the induction heating and cooking arts will recognize that the power density profile for fixed, uniform coils will peak near the middle of the coil and dissipate away from this peak towards the inner center and the outer periphery of the coil.

Figure 2:
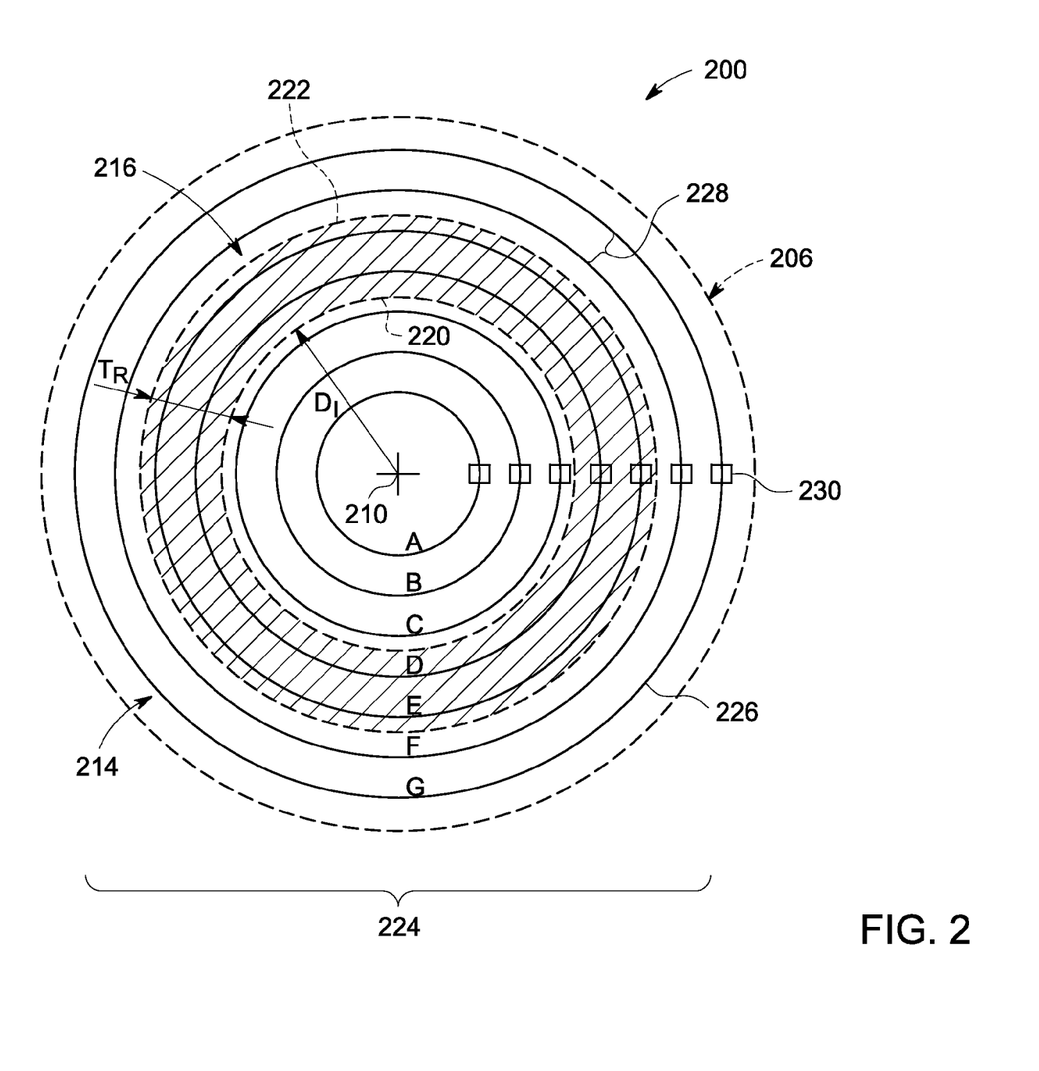
FIG. 2 is a top, schematic view of another exemplary embodiment of an induction heating system.
Figure 3:
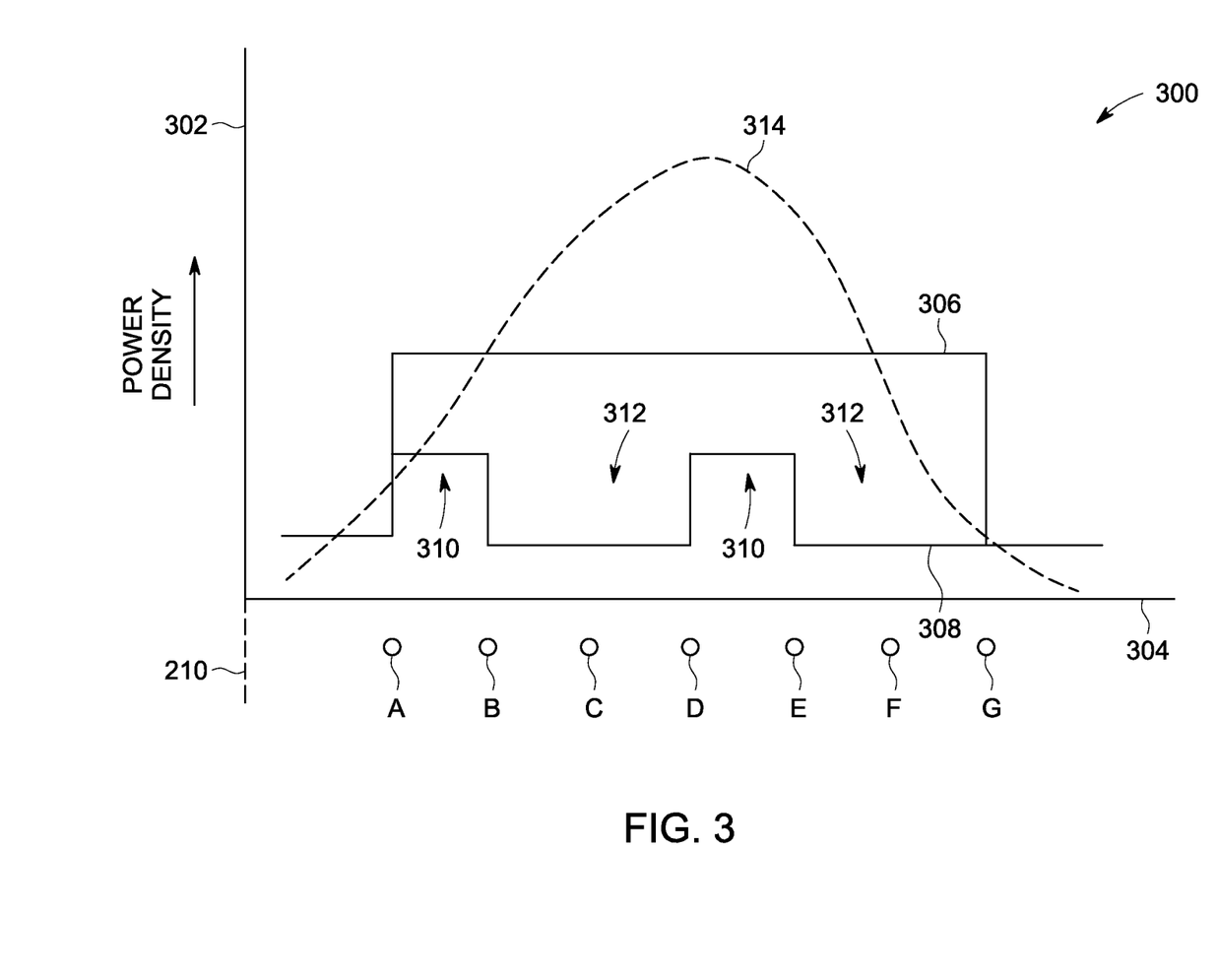
FIG. 3 is a plot of a power density profile for the induction heating system of FIG. 2.

To further illustrate the concepts of the present disclosure reference can now be had to FIGS. 2 and 3, in which there is illustrated, respectively, another exemplary embodiment of an induction heating system 200 and a plot of an example of a power density profile 300 generated by the induction heating system 200. Like numerals are used to identify like components as between FIGS. 1 and 2, except that the numerals are increased by 100. For example the induction heating system 200 comprises an induction element 206 with a center axis 210 and a heating zone 214. A heating ring 216 is shown in the heating zone 214. The heating ring 216 comprises an inner boundary 220 and an outer boundary 222, wherein the two are separated by a ring thickness $T_R$ and located by an inner radial dimension $D_I$. The particular operative dimensions of the heating ring 216 vary selectively as hereinafter described in greater detail.

The induction element 206 comprises an induction ring array 224 with a plurality of coils or inductive rings 226 wound concentrically about the center axis 210. Each of the inductive rings 226 has a ring diameter $D_R$, with the ring diameter $D_R$ being configured so that concentrically adjacent ones of the inductive rings 226 are separated by a separation distance 228. A tap 230 is coupled to each of the inductive rings 226 at which an input (not shown) including an alternative current (AC) input is impressed upon the inductive ring array 224 such as upon the inductive rings 226 alone or in various combinations as discussed and contemplated herein.

The AC input activates one or more of the inductive rings 226 to define generally the heating ring 216 in which magnetic energy is transferred to an object (e.g., the object 104 (FIG. 1)). In one implementation, the inductive ring array 224 comprises a first inductive ring (e.g., the inductive ring G) proximate the outer periphery of the heating zone 214 and a second inductive ring (e.g., the inductive ring A) proximate the center axis 210 of the heating zone 214. In such configuration at least one of the inductive rings 226 can be activated at the outer most extent to which induction is to occur between the induction element 206 and an object (not shown) disposed thereon. For example, the inductive ring array 224 is configured to conduct power serially between the first inductive ring and the second inductive ring. Energizing can occur simultaneously, although the inventors recognize that, in one example, introducing power to the serially connected inductive ring array 224 may energize certain of the inductive rings before others in the array 224. Additional ones of the inductive rings 226 can also be activated such as to define the geometry (e.g., the ring thickness $T_R$) and the location (e.g., inner radial dimension $D_I$) for the heating ring 216.

The induction element 206 can comprise various materials including conductive and non-conductive materials. The inventors contemplate constructions that are compatible with a wide variety of vessels and objects. These vessels may comprise any available metallic container used in food preparation. Exemplary containers are made of magnetic materials such as magnetic stainless steel or cast iron, a non-magnetic material such as aluminum, or a laminate product such as copper on stainless steel. In one embodiment, each of the inductive rings 226 comprises aluminum and/or copper conductors such as copper litz wire, which is disposed about the center axis 210 such as in concentrically-wound individual rings, i.e., one copper litz wire for each of the inductive rings 226. The inventors also contemplate the use of composites and combinations of materials such as in the form of laminated or multi-layer structures, in which materials are selected, for example, to enhance and/or tailor the inductive properties of the inductive rings 226 and related components. An insulator such as a dielectric material is considered as suitable to be disposed between the inductive rings 226. These materials are useful to fill gaps and void such as are formed by the separation distance 228 and to insulate the inductive rings 226 from one another.

In one embodiment, the inductive rings 226 are uniformly spaced such as would occur when the separation distance 228 is substantially the same between concentrically adjacent ones of the inductive rings 226. This uniformity can occur across the induction ring array 224. Exemplary values for the separation distance 228 can include values of at least about 10 mm, however these values can vary such as from about 1 mm to about 50 mm as desired. The spacing and/or separation of the inductive rings 226 can also be characterized by the density or number of the inductive rings 226 provided in the heating zone 214. The density can vary such as from about 2 rings per radial inch to about 6 rings per radial inch, with one example in which the density is about 4 rings/in.

Selective operation of the induction element 206 is also useful to characterize the induction element 206 as well as to define the number, spacing, density, and/or other parameters of the inductive rings 226. Selective operation includes the formation of the heating ring 216, and one construction permits the formation of a plurality of heating rings (e.g., the heating ring 216) and control (and manipulation) of the power density profile across the heating zone 214. The resulting heating rings can be separated by some amount of spacing, such as spacing measured radially from the center axis 210. Spacing may be uniform between concentrically adjacent heated rings or varied such as would correspond to unique parameters for each of the heating rings, e.g., unique values for the ring thickness $T_R$ and/or the inner radial dimension $D_I$. In one particular construction, the induction element 206 is configured to generate from about 2 to about 5 adjacent and/or concentric heating rings within the heating zone 214, wherein each of the heating rings can have the same or varying values for the radial thickness $T_R$. Of course, the concepts are amenable so that the number of heating rings that can be generated is a function of not only the arrangement of the inductive rings 226, but also the physical and natural constraints that may limit or even preclude formation of heating rings of certain dimensions. Any limitations are not, however, considered to affect the concepts nor the scope and spirit of the subject matter discussed and presented in this disclosure.

Discussing the operation of one embodiment of the induction heating system 200, current such as AC current is applied to the inductive rings 226. AC current causes, e.g., the copper litz wires, to generate a magnetic field that creates heat in the object. Unlike conventional inductive cooking devices, however, the induction element 206 is configured so that each of the inductive rings 226 is energized independent of other ones of the inductive rings 226 in the induction ring array 224. This arrangement permits power to be supplied individually to each of the inductive rings 226 or to a plurality of the inductive rings 226 as desired. In one example, the inductive rings 226 that are desired to be active are electrically coupled or otherwise connected or communicate in series. This configuration permits selective activation of the induction element 206, thereby causing to be selectively generated one or more of the heating ring 216, each with properties and parameters discussed above.

For a better understanding, consider in the present example that the number of the inductive rings 226 is seven (7), as depicted and labeled A-G in FIG. 2. The geometry of the heating ring 216 can vary as between, for example, activation of only the inductive ring A, activation of the inductive rings A-B, as well as activation of any one or more and up to and including all of the inductive rings A-G. The location of the heating ring 216 can change such as if only the inductive rings B-C are activated, or in another example, if only the inductive rings D-G are activated. Moreover, when multiple ones of the heating rings 216 are preferred, selective energizing of the induction rings A-G is contemplated in which, for example, a first heating ring (not shown) is formed by inductive rings A-B and a second heating ring (not shown) is formed by inductive rings D-E. In one example, the induction element 206 is configured to generate the first heating ring and the second heating ring that are separate by a distance that is less than the separation distance between the induction rings 226.

These features are beneficial because they permit active control and precise tuning of the power density profile for the induction element 206. In one example, the power density profile defines the induced power density that is coupled (or inducted) to the object as a function of the area of the heating zone 214. As illustrated in the exemplary power density profile of FIG. 3, providing individualized control of each of the inductive rings 226 controls spikes, peaks, and other abnormalities in the power density profile normally associated with inductive cooking devices that have uniformly spaced inductive rings.

In FIG. 3, a power density profile (e.g., the power density profile 300) is defined in connection with a vertical axis 302, which identifies the power density input to the object per unit of area of the heating zone 214 (FIG. 2), and a horizontal axis 304 that indicates the position of the inductive rings 226 (FIG. 2) as related to the center axis 210 (FIG. 2) of the induction element 206 (FIG. 2). The horizontal axis 304 includes a center axis 210 and the inductive rings A-G, which in context of the present discussion are individually constructed and uniformly spaced from one another and with respect to the center axis 210.

On the axes is plotted a first profile 306 and a second profile 308, each of which represent at least one exemplary operation of the induction heating systems as contemplated herein. The first profile 306 and the second profile 308 are indicative of the arrangement and selective operation of the inductive rings A-G. In one example, the first profile 306 is indicative of uniform heating that is caused when each of the inductive rings A-G are energized. The second profile 308 is indicative of operation in which inductive rings A-B and D-E are energized, thereby forming in the second profile 308 a series of peaks 310 and valleys 312 that conform to, respectively, the activated and inactivated ones of the induction rings A-G. For comparison, a third profile 314 is also depicted and is indicative of systems in which the inductive ring is configured as a single member wound (or spiraling) coil about, e.g., the center axis 210 in the form of the uniform arrangement in conventional induction cooking systems.

Noted is that the third profile 314 is not uniform and peaks radially proximate the center portion of, e.g., the single wound coil. This peaked profile causes non-uniform heating, and when the object such as a pan is subjected to the third profile 314 portions of food being cooked proximate the center intermediate annular region of the heating zone 214 (FIG. 2) are overheated while portions of the food proximate the radially inner and outer annular regions of the heating zone 214 (FIG. 2) are underheated. On the other hand, configurations of the inductive rings A-G effectively reduce, and may eliminate, the peak in the energy profile (as shown by the first profile 306) while still implementing the uniform arrangement of the inductive rings 226 discussed above. Control of the power density profile is illustrated as between the first profile 306 and the second profile 308, wherein the peaks 310 and valleys 312 are the result of selective operation of the induction rings A-G, which is not possible with the single wound coil design.

Figure 4:
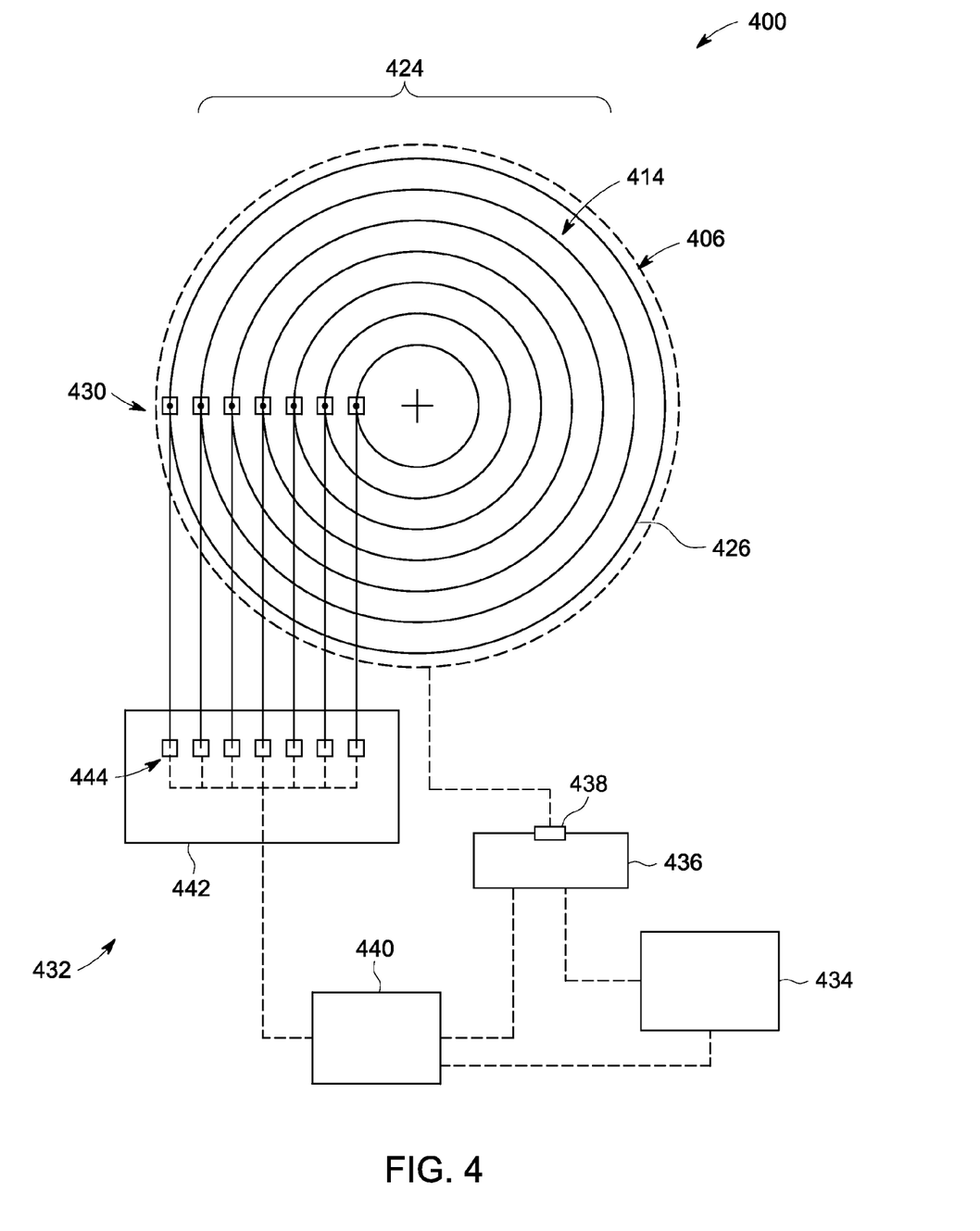
FIG. 4 is a top, schematic view of yet another exemplary embodiment of an induction heating system on which can be employed the power density profile of FIG. 3.

Referring next to FIG. 4, another exemplary embodiment of an induction heating system 400 is illustrated. Like numerals are used to identify like components as between FIGS. 1, 2, and 4, but the numerals are increased by 100. By way of example, the induction heating system 400 includes an induction element 406 with a heating zone 414, in which is located an induction ring array 424. A plurality of inductive rings 426 with taps 430 are also provided and arranged in one example as individually wound coils of copper litz wire and/or other inductive material.

In one embodiment, the induction heating system 400 comprises a control structure 432 that has a power supply 434 such as a 3700 Watt resonant half-bridge inverter power supply. A power application switching device 436 is provided with a power switch 438 that is coupled to the power supply 434 and to the induction element 406. The power switch 438 regulates power to the inductive rings 426. There is also provided a control device 440, which is coupled to and configured to communicate with the power application switching device 436. The control structure 432 also includes a coil geometry switching device 442 that is responsive to the control device 440. The coil geometry switching device 442 comprises a plurality of ring switches 444, one each coupled to the inductive rings 426 such as via the taps 430.

Generating one or more power density profiles (e.g., the first profile 306 and the second profile 308) is accomplished by coupling the power supply 434 to corresponding ones of the inductive rings 426. Individualized switches for each of the inductive rings 426 permits individual ones of the inductive rings 426 to be activated independently from other ones of the inductive rings 426. Thus, in one embodiment, activation of the ring switches 444 that correspond to the inductive rings 426 desired to be activated is required to energize the inductive rings 426 at the same time. In one example, closing (or activating) the ring switches 444 places in series (or serial communication) the inductive rings 426 that are coupled to the ring switches 444 that are activated. When power is applied to, e.g., the induction element 406, the inductive rings 426 that are coupled are energized, thereby forming in one example heating rings (e.g., the heating rings 116, 216) having particular characteristics defined in accordance with the inductive rings 426 that are energized.

Switches for use as the power switch 438 and the ring switches 444 include, for example, a relay, a triode for alternating current (TRIAC), a field effect transistor (FET) (e.g., a metal-oxide-semiconductor field effect transistor (MOSFET)), an isolated gate bipolar transistors (IGBT), and the like. Mechanical switches such as toggle switches, mechanical relays, and switches that respond to an input by way of mechanically changing the state of the switch are likewise contemplated for use as the power switch 438 and the ring switches 444.

In one embodiment, the power density profile for the induction element 406 is achieved by way of the control device 440. This control device 440 is configured to regulate activation of specific ones of the inductive rings 426 such as by opening or closing (or activating) one or more of the ring switches 444 in conjunction with the power switch 438. The control device 440 can act in response to inputs, e.g., one or more settings for the induction heating system 400. Settings can include settings associated with positioning of a mechanical device (not shown) such as knobs that are actuated by an end user. The settings can also include settings from electrical devices such as arise from portions of the control device 440 or that are delivered and/or stimulated via inputs from other devices coupled to the control structure 432. These devices can include electrical circuits peripheral to the elements of the induction heating system 400 such as are found when the induction heating system 400 is implemented as part of an appliance, e.g., a stove, a range, a cooktop, and/or an oven.

Figure 5:
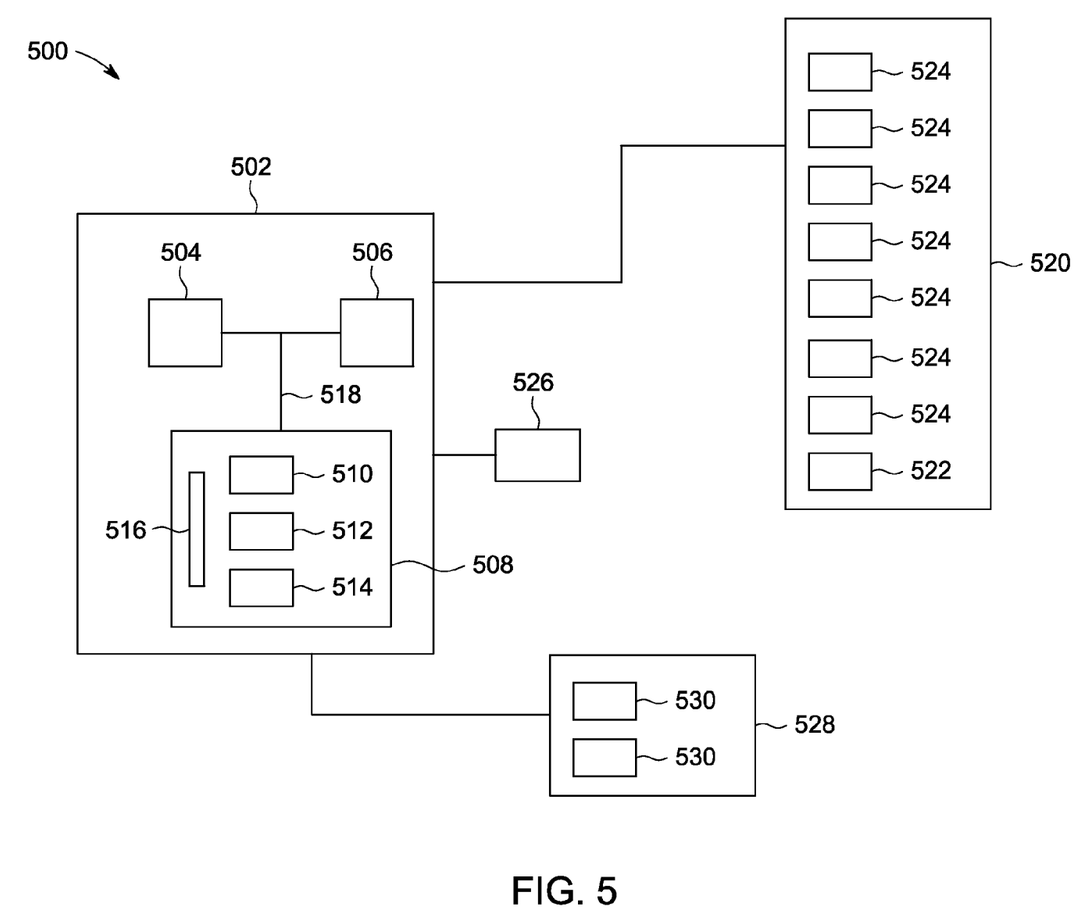
FIG. 5 is a schematic diagram of an example of a control scheme for use with an induction heating system such as the induction heating systems of FIGS. 1, 2, and 4.

A variety of control configurations and schemes can be used to implement the concepts of the present disclosure. The example of FIG. 5 provides a schematic diagram of one configuration of an exemplary control scheme 500 for use in, e.g., the induction heating system 100 (FIG. 1), 200 (FIG. 2), and 400 (FIG. 4). The control scheme 500 comprises a controller 502 (e.g., the control device 440), which includes a processor 504, a memory 506, and control circuitry 508 configured for general operation of the induction heating system. The control circuitry 508 comprises a coil geometry circuit 510, a power supply circuit 512, a power switching circuit 514, and a feedback circuit 516. All of these components are coupled together and communicate to one another when applicable via one or more busses 518.

The control scheme 500 further includes switches 520, illustrated in the present example as a power switch 522 (e.g., the power switch 438) and ring switches 524 (e.g., the ring switches 444). The control scheme 500 also includes a power supply 526. Examples of the control scheme 500 are contemplated in which the coil geometry circuit 510 is coupled to the ring switches 524, the power switching circuit 514 is coupled to the power switch 522, and the power supply circuit 512 is coupled to the power supply 526. In one embodiment, the controller 502 is coupled to a control panel 528 that includes one or more heating controls 530. When implemented in connection with the induction heating system, the controller 502 effectuates operation of the various elements of the system such as in response to inputs from the control panel 528. The feedback circuit 516 is provided to monitor conditions of the system such as heating conditions of object disposed in communication with the induction element. Other system feedback include pan detection, power level detection, and current feedback (e.g., coil current feedback).

The control scheme 500 and its constructive components are configured to communicate amongst themselves and/or with other circuits (and/or devices), which execute high-level logic functions, algorithms, as well as firmware and software instructions. Exemplary circuits of this type include, but are not limited to, discrete elements such as resistors, transistors, diodes, switches, and capacitors, as well as microprocessors and other logic devices such as field programmable gate arrays ("FPGAs") and application specific integrated circuits ("ASICs"). While all of the discrete elements, circuits, and devices function individually in a manner that is generally understood by those artisans that have ordinary skill in the electrical arts, it is their combination and integration into functional electrical groups and circuits that generally provide for the concepts that are disclosed and described herein.

The electrical circuits of the controller 502 are sometimes implemented in a manner that can physically manifest logical operations, which are useful to facilitate heating, cooking, and other operations of the induction heating systems and related appliances discussed herein. These electrical circuits can replicate in physical form an algorithm, a comparative analysis, and/or a decisional logic tree, each of which operates to assign an output and/or a value to the output such as to actuate the switches 520 and to activate the power supply 526.

In one embodiment, the processor 504 is a central processing unit (CPU) such as an ASIC and/or an FPGA. The processor 504 can also include state machine circuitry or other suitable components capable of receiving inputs from, e.g. the control panel 528. The memory 506 includes volatile and non-volatile memory and can be used for storage of software (or firmware) instructions and configuration settings. Each of the coil geometry circuit 510, the power supply circuit 512, the power switching circuit 514, and the feedback circuit 516 can be embodied as stand-alone devices such as solid-state devices. These devices can be mounted to substrates such as printed-circuit boards, which can accommodate various components including the processor 504, the memory 506, and other related circuitry to facilitate operation of the controller 502 in connection with its implementation in the induction heating system.

However, although FIG. 5 shows the processor 504, the memory 506, the coil geometry circuit 510, the power supply circuit 512, the power switching circuit 514, and the feedback circuit 516 as discrete circuitry and combinations of discrete components, this need not be the case. For example, one or more of these components can be contained in a single integrated circuit (IC) or other component. As another example, the processor 504 can include internal program memory such as RAM and/or ROM. Similarly, any one or more of functions of these components can be distributed across additional components (e.g., multiple processors or other components).

Figure 6:
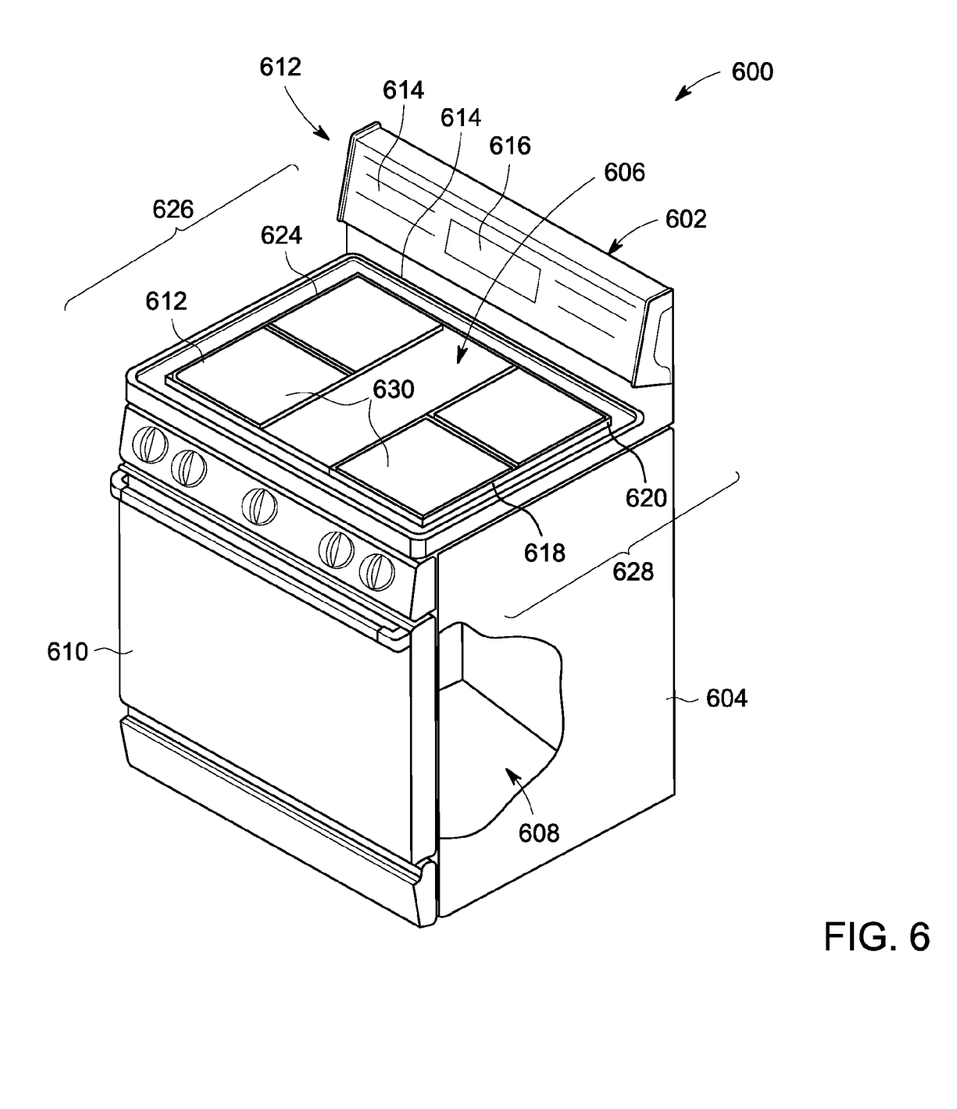
FIG. 6 is top, perspective view of an appliance for use with an induction heating system such as the induction heating systems of FIGS. 1, 2, and 4.

Implementation of the induction cooking systems is relevant with respect to the exemplary embodiment of a cooking appliance 600 in FIG. 6. The cooking appliance 600 is depicted in the form of a free-standing range 602 including an outer body or cabinet 604 that includes a cooktop 606 of generally rectangular shape. A cavity 608 is positioned below cooktop 606 and has a front-opening access door 610. The cavity 608 can include a heating element (not shown) disposed therein, wherein operation of the heating element changes the temperature of the cavity 608 such as during cooking. A range backsplash 612 extends upward from a rear portion 614 of cooktop 606 and contains a multi-functional display 616 for selecting operative features of heating elements for cooktop 606 and/or the cavity 608. Cooktop 606 includes four surface heating units 618, 620, 622, and 624, which are positioned in spaced apart pairs 626 and 628 positioned adjacent each side of cooktop 606. Each surface heating unit 618, 620, 622, and 624 comprises an induction element 630, which is configured as one or more of the induction elements 106, 206, and 406 discussed above.

Cooking appliance 600 is provided by way of illustration rather than limitation, and accordingly there is no intention to limit application of the concepts of the present disclosure to any particular appliance or cooktop, such as range 602 or cooktop 606. In addition, it is contemplated that induction heating systems discussed herein are applicable to many types of cooking appliance as well as to free-standing cooktops that are configured to be disposed on or otherwise supported on a countertop and/or without the other features of the appliance secured thereto.

Where applicable it is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

This written description uses examples to disclose the invention, including the best mode, and also to enable any person skilled in the art to practice the invention, including making and using any devices or systems and performing any incorporated methods. The patentable scope of the invention is defied by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A heating device comprising:
   a heating zone;
   a plurality of inductive rings concentrically disposed across the heating zone and configured to receive a heating power;
   a power switching device coupled to the plurality of inductive rings and configured to produce the heating power; and
   a coil geometry switching device coupled separately to each inductive ring in the plurality of inductive rings,
   wherein the coil geometry switching device is configured to selectively energize a set of two or more inductive rings in the plurality of inductive rings, and to conduct the heating power serially through the inductive rings in the energized set of two or more inductive rings, and
   wherein the energized set of two or more inductive rings is selected to generate two or more concentric heating rings, wherein each heating ring is radially spaced apart from an adjacent heating ring.

2. A heating device according to claim 1, wherein the energized set of two or more inductive rings is configured to generate a power density profile that is uniform across the heating zone.

3. A heating device according to claim 2, wherein the plurality of inductive rings are uniformly spaced radially across the heating zone.

4. A heating device according to claim 1, wherein each inductive ring in the plurality of inductive rings comprises a tap at which the heating power is coupled to the inductive ring.

5. A heating device according to claim 1, wherein the plurality of inductive rings comprises a first inductive ring proximate an outer periphery of the heating zone and a second inductive ring proximate a center axis of the heating zone.

6. A heating device according to claim 1, wherein at least one of the inductive rings comprises copper litz wire.

7. A heating device according to claim 1, further comprising an insulator disposed between each of the inductive rings.

8. An induction heating appliance the appliance comprising:
   a cooktop;
   a power supply configured to produce a heating power; and
   one or more surface heating units disposed on the cooktop and coupled to the power supply,
   wherein each surface heating unit comprises:
   a heating zone;
   a plurality of inductive rings concentrically disposed across the heating zone;
   a switching device coupled separately to each inductive ring in the plurality of inductive rings; and
   a control device coupled to the switching device and the power supply,
   wherein the plurality of inductive rings is coupled to the power supply and configured to receive the heating power,
   wherein the control device is configured to operate the switching device to selectively energize a set of two or more inductive rings in the plurality of inductive rings, and to conduct the heating power serially through the energized set of two or more inductive rings, and
   wherein the control device is further configured to operate the switching device to generate two or more concentric heating ring, wherein each heating ring is radially spaced apart from an adjacent heating ring.

9. An appliance according to claim 8, Wherein the plurality of inductive rings are uniformly spaced across the heating zone.

10. An appliance according to claim 9, wherein the plurality of inductive rings have a spacing density of at least about 2 inductive rings per radial inch.

11. An appliance according to claim 8, wherein the switching device comprises a ring switch for each inductive ring in the plurality of inductive rings.

12. An appliance according to claim 11, wherein the ring switch is selected from a group comprising a metal-oxide-semiconductor field effect transistor and a triode for alternating current.

13. An appliance according to claim 11, wherein the plurality of inductive rings comprise a first inductive ring proximate an outer periphery of the heating zone and a second inductive ring proximate a center axis of the heating zone.

14. An appliance according to claim 8, wherein the surface heating unit is configured to generate a power density profile that is uniform across the heating zone.

15. An appliance according to claim 8, wherein the cooktop is configured for use on a countertop.

\* \* \* \* \*